(12) United States Patent
Moore, Jr. et al.

(10) Patent No.: US 6,515,034 B2
(45) Date of Patent: *Feb. 4, 2003

(54) CO-HYDROPROCESSING OF FISCHER-TROPSCH PRODUCTS AND CRUDE OIL FRACTIONS

(75) Inventors: Richard O. Moore, Jr., San Rafael, CA (US); Roger D. Van Gelder, Beaconsfield (GB)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/854,201

(22) Filed: May 11, 2001

(65) Prior Publication Data

US 2002/0169220 A1 Nov. 14, 2002

(51) Int. Cl.$^7$ .......................... C07C 27/00; C07C 5/13; C10G 35/06
(52) U.S. Cl. ................. 518/700; 518/702; 585/734; 585/750; 208/136
(58) Field of Search ................... 518/700, 702; 585/734, 750; 208/136

(56) References Cited

U.S. PATENT DOCUMENTS

| | | |
|---|---|---|
| 4,568,663 A | 2/1986 | Mauldin |
| 5,536,687 A | 7/1996 | Ward |
| 5,885,438 A | 3/1999 | Apelian et al. |
| 5,925,235 A | 7/1999 | Habib |
| 5,993,643 A | 11/1999 | Chang et al. |
| 6,030,921 A | 2/2000 | Ziemer |
| 6,051,127 A | 4/2000 | Moureaux |
| 6,075,061 A | 6/2000 | Wittenbrink et al. |
| 6,093,672 A | 7/2000 | Winquist et al. |
| 6,096,940 A | 8/2000 | Wittenbrink et al. |
| 6,149,799 A | 11/2000 | Raybaud et al. |
| 6,168,768 B1 | 1/2001 | Alexion et al. |

FOREIGN PATENT DOCUMENTS

| | | |
|---|---|---|
| AU | A-57666/94 | 9/1994 |
| EP | 0532118 A1 | 3/1993 |
| EP | 0609079 A1 | 8/1994 |
| EP | 0921184 A1 | 6/1999 |
| WO | WO 00/42119 A1 | 7/2000 |
| WO | WO 00/60029 A1 | 10/2000 |

OTHER PUBLICATIONS

U.S. patent application Ser. No. 09/267,095, Habib et al.
U.S. patent application Ser. No. 08/883,006, Ziemer.

*Primary Examiner*—Jafar Parsa
(74) *Attorney, Agent, or Firm*—Burns, Doane, Swecker & Mathis, L.L.P.

(57) ABSTRACT

An integrated process for producing a hydrocarbon stream, preferably including predominantly $C_{5-20}$ normal and iso-paraffins, is disclosed. The process involves isolating a $C_4$– stream and, optionally a $C_5$+ stream ("natural gas condensate") from a natural gas source. The $C_4$– stream is converted to syngas, and the syngas used in a hydrocarbon synthesis process, for example, Fischer-Tropsch synthesis. In one embodiment, one or more fractions from the hydrocarbon synthesis are blended with one or more crude oil derived fractions, and, optionally, the natural gas condensate, such that the overall sulfur content of the blend is less than about 200 ppm. If necessary, the crude oil fractions and/or natural gas condensate can be treated to lower the sulfur content so that the blend has an acceptable sulfur level. The fraction from the hydrocarbon synthesis may include, for example, $C_{5-20}$ hydrocarbons, $C_{20}$+ hydrocarbons, or $C_5$+ hydrocarbons. In this embodiment, the hydroprocessing catalysts are noble metal-containing catalysts, which tend to be sensitive to sulfur concentrations above about 200 ppm. The catalysts preferably have high selectivity for $C_5$+ products, such that a significant $C_4$– fraction is not formed. In another embodiment, one or more fractions from the hydrocarbon synthesis are blended with one or more crude oil derived fractions, and, optionally, the natural gas condensate, such that the overall sulfur content of the blend is more than about 200 ppm. The fraction from the hydrocarbon synthesis may include, for example, $C_{5-20}$ hydrocarbons, $C_{20}$+ hydrocarbons, or $C_5$+ hydrocarbons. In this embodiment, conventional sulfur-tolerant hydroprocessing catalysts can be used.

17 Claims, No Drawings

CO-HYDROPROCESSING OF FISCHER-TROPSCH PRODUCTS AND CRUDE OIL FRACTIONS

FIELD OF THE INVENTION

This invention is generally in the area of Fischer-Tropsch synthesis.

BACKGROUND OF THE INVENTION

The majority of fuel today is derived from crude oil. Crude oil is in limited supply, and fuel derived from crude oil tends to include nitrogen-containing compounds and sulfur-containing compounds, which are believed to cause environmental problems such as acid rain.

Although natural gas includes some nitrogen- and sulfur-containing compounds, methane can be readily isolated in relatively pure form from natural gas using known techniques. Many processes have been developed which can produce fuel compositions from methane. Most of these process involve the initial conversion of methane to synthesis gas ("syngas").

Fischer-Tropsch chemistry is typically used to convert the syngas to a product stream that includes a broad spectrum of products, ranging from methane to wax, which includes a significant amount of hydrocarbons in the distillate fuel range ($C_{5-20}$).

Methane tends to be produced when chain growth probabilities are low, which is generally not preferred. Heavy products with a relatively high selectivity for wax are produced when chain growth probabilities are high. The wax can be processed to form lower molecular weight products, but this processing often results in undesired formation of $C_{1-4}$ products. Paraffinic Fischer-Tropsch products tend to be mostly linear, and tend to have relatively low octane values, relatively high pour points and relatively low sulfur contents. They are often isomerized to provide products with desired boiling ranges and pour point values.

Many isomerization catalysts require low levels of sulfur and nitrogen impurities, and feedstreams for these catalysts are often hydrotreated to remove any sulfur and nitrogen compounds. When isomerization processes are carried out with non-sulfided catalysts, various side reactions, such as hydrogenolysis (hydrocracking), can occur, producing undesired $C_1$–$C_4$ hydrocarbons. One approach to dealing with this limitation is to suppress hydrogenolysis by incorporating a small amount of sulfur-containing compounds into the feed, or by using other hydrocracking suppressants. A disadvantage of this approach is that it adds sulfur compounds to an otherwise essentially sulfur-free composition, which may not be desired.

It would be advantageous to provide additional processes for treating Fischer-Tropsch products which maximize formation of a mid-distillate ($C_{5-20}$) product stream. The present invention provides such processes.

SUMMARY OF THE INVENTION

An integrated process for producing a hydrocarbon stream, preferably including predominantly $C_{5-20}$ normal and iso-paraffins, is disclosed. The process involves isolating a methane-rich stream, i.e. predominantly a $C_4$– stream, and a $C_5$+ stream ("natural gas condensate") from a natural gas source. The methane-rich stream is converted to syngas, and the syngas used in a hydrocarbon synthesis process, for example, Fischer-Tropsch synthesis.

In a first embodiment, one or more fractions from the hydrocarbon synthesis are blended with one or more crude oil derived fractions, and, optionally, the natural gas condensate, such that the overall sulfur content of the blend is less than about 200 ppm. If necessary, the crude oil fractions and/or natural gas condensate can be treated to lower the sulfur content so that the blend has an acceptable sulfur level. The fraction from the hydrocarbon synthesis may include, for example, $C_{5-20}$ hydrocarbons, $C_{20+}$ hydrocarbons, or $C_5$+ hydrocarbons.

The blended hydrocarbons are subjected to hydroprocessing conditions. Olefins and oxygenates are hydrotreated to form paraffins. Paraffins are subjected to hydroisomerization conditions to form isoparaffins. Hydrocarbons with chain lengths above a desired value, for example, $C_{24}$, are hydrocracked.

In this embodiment, the hydroprocessing catalysts are noble metal-containing catalysts, which tend to be sensitive to sulfur concentrations above about 200 ppm. The catalysts preferably have high selectivity for $C_5$+ products, such that a significant $C_4$– fraction is not formed. Because the catalysts minimize the hydrogenolysis that would otherwise form $C_{1-4}$ hydrocarbons, $C_{20+}$ products can be combined with the natural gas condensate and the hydroprocessing conditions can be adjusted, for example, to maximize formation of a $C_{5-20}$ hydrocarbon product in the distillate fuel range, or formation of a $C_{20+}$ fraction in the lube base oil range, with mid-distillate products having carbon numbers predominately in the $C_{5-20}$ range being particularly preferred.

In a second embodiment, one or more fractions from the hydrocarbon synthesis are blended with one or more crude oil derived fractions, and, optionally, the natural gas condensate, as in the first embodiment, but wherein the overall sulfur content of the blend is more than about 200 ppm. The blended hydrocarbons are subjected to hydroprocessing conditions as in the first embodiment, but using hydroprocessing catalysts that are not sulfur-sensitive. Preferably, at least one of the catalyst components is a pre-sulfided catalyst, for example, a pre-sulfided Group VM non-noble metal or a Group VI metal (e.g. tungsten or molybdenum) catalyst. The sulfur compounds present in the crude oil fractions and/or natural gas condensate can act as a hydrocracking suppressant, and minimize the amount of hydrocracking (hydrogenolysis) which would otherwise occur during the hydroprocessing reaction and form undesired $C_4$– products.

After the hydroprocessing steps, any remaining heteroatom-containing compounds can be removed, for example, using adsorption, extractive Merox or other means well known to those of skill in the art.

Optionally, at least a portion of the $C_{2-4}$ products from the hydrocarbon synthesis step can be subjected to further processing steps, for example, olefin oligomerization, to provide an additional $C_{5-20}$ product stream. This product stream may also be hydroprocessed in combination with the crude oil fractions, hydrocarbon synthesis products and/or natural gas condensate.

DETAILED DESCRIPTION OF THE INVENTION

An integrated process for producing a hydrocarbon stream, preferably including a predominantly $C_{5-20}$ normal and iso-paraffin fraction, is disclosed. The process involves isolating a $C_4$– stream and, optionally, a natural gas condensate, from a natural gas source. The $C_4$– stream, or a portion thereof (i.e., a methane-rich portion), is converted to syngas, and the syngas used in a hydrocarbon synthesis process, for example, Fischer-Tropsch synthesis.

In a first embodiment, one or more fractions from the hydrocarbon synthesis (for example, $C_{5-20}$ and/or $C_{20}+$ fractions) are blended with one or more crude oil fractions and, optionally, the natural gas condensate such that the overall sulfur content of the blend is less than about 200 ppm. The crude oil fractions are preferably similar in boiling point to the fractions from the hydrocarbon synthesis, i.e., are $C_{5-20}$ and/or $C_{20}+$ fractions. As used herein, carbon number ranges for hydrocarbons are indicated using "Cn" designations: $C_5^+$ indicates a carbon number of 5 or higher, $C_{5-20}$ indicates a carbon range between 5 and 20, inclusively, $C_{2-4}$ indicates a carbon range between 2 and 4 inclusively, $C_{20}$ indicates a carbon number of 20, etc.

If necessary, the natural gas condensate can be treated to lower the sulfur content so that the blend has an acceptable sulfur level. In a second embodiment, a blend similar to that in the first embodiment is prepared, wherein the sulfur content of the blend is greater than about 200 ppm.

The blended hydrocarbons in both embodiments are subjected to hydroprocessing conditions. Olefins and oxygenates are hydrotreated to form paraffins. Paraffins are subjected to hydroisomerization conditions to form isoparaffins. Hydrocarbons with chain lengths above a desired value, for example, $C_{24}$, are hydrocracked.

In the first embodiment, the hydroprocessing catalysts are noble metal-containing catalysts. The catalysts preferably have high selectivity for $C_5+$ products, such that a significant $C_4-$ fraction is not formed. The hydrogenolysis that would otherwise produce undesired $C_{1-4}$ products during conventional hydroprocessing steps (i.e., hydrocracking) is minimized by judicious selection of noble metal catalysts which minimize the formation of $C_{1-4}$ fractions, resulting in optimized formation of a $C_{5-20}$ hydrocarbon fraction. In the second embodiment, the catalysts are catalysts typically used for hydroprocessing reactions, preferably those which have selectivity for mid-distillate products.

According to the invention, natural gas is sent to a separator and a methane-rich $C_{1-4}$ fraction is isolated. The methane-rich fraction is sent to a gas-to-liquids plant, which includes a syngas generator, a Fischer-Tropsch synthesis process, and a process upgrading reactor which performs the hydroprocessing reactions. $C_{5-20}$ hydrocarbons are isolated from the Fischer-Tropsch reactor, combined with a crude oil fraction, and subjected to hydroprocessing reactions. The catalysts, reactants, reaction conditions and methods for isolating desired compounds are discussed in more detail below.

Natural Gas

In addition to methane, natural gas includes some heavier hydrocarbons (mostly $C_{2-5}$ paraffins) and other impurities, e.g., mercaptans and other sulfur-containing compounds, carbon dioxide, nitrogen, helium, water and non-hydrocarbon acid gases. Natural gas fields also typically contain a significant amount of $C_5+$ hydrocarbons (natural gas condensate), which is liquid at ambient conditions.

The natural gas condensate may or may not include an appreciable amount of sulfur-containing compounds, depending on the natural gas source and any pre-treatments to remove sulfur. The sulfur content of the natural gas condensate may or may not be lowered, depending on whether the sulfur content of the blend of the natural gas condensate and the hydrocarbon synthesis products is above about 200 ppm.

The methane and, optionally, some or all of the $C_{2-4}$ hydrocarbons can be isolated and used to generate syngas. Various other impurities can be readily separated. Inert impurities such as nitrogen and helium can be tolerated.

Syngas

Methane and other low molecular weight ($C_{2-4}$) hydrocarbons can be sent through a conventional syngas generator to provide synthesis gas. Typically, synthesis gas contains hydrogen and carbon monoxide, and may include minor amounts of carbon dioxide, water, unconverted hydrocarbons and various other impurities.

The presence of sulfur, nitrogen, halogen, selenium, phosphorus and arsenic contaminants in the syngas is undesirable. For this reason, it is preferred to remove sulfur and other contaminants from the feed before performing the Fischer-Tropsch chemistry or other hydrocarbon synthesis. Means for removing these contaminants are well known to those of skill in the art. Hydrotreating processes may be used to remove a large proportion of the sulfur from the methane-rich stream. Alternatively or additionally, ZnO guard beds may be used removing sulfur impurities. Means for removing other contaminants are well known to those of skill in the art.

Fischer-Tropsch Synthesis

Catalysts and conditions for performing Fischer-Tropsch synthesis are well known to those of skill in the art, and are described, for example, in EP 0 921 184 A1, the contents of which are hereby incorporated by reference in their entirety.

In the Fischer-Tropsch synthesis process, liquid and gaseous hydrocarbons are formed by contacting a synthesis gas (syngas) comprising a mixture of H2 and CO with a Fischer-Tropsch catalyst under suitable temperature and pressure reactive conditions. The Fischer-Tropsch reaction is typically conducted at temperatures of about from 300 to 700° F. (149 to 371° C.) preferably about from 400° to 550° F. (204° to 228° C.); pressures of about from 10 to 600 psia, (0.7 to 41 bars) preferably 30 to 300 psia, (2 to 21 bars) and catalyst space velocities of about from 100 to 10,000 cc/g/hr., preferably 300 to 3,000 cc/g/hr.

The products range from $C_1$ to $C_{200}+$ with a majority in the $C_5$ to $C_{100}+$ range. The reaction can be conducted in a variety of reactor types for example, fixed bed reactors containing one or more catalyst beds, slurry reactors, fluidized bed reactors, or a combination of different type reactors. Such reaction processes and reactors are well known and documented in the literature. Slurry Fischer-Tropsch processes, which is a preferred process in the practice of the invention, utilize superior heat (and mass) transfer characteristics for the strongly exothermic synthesis reaction and are able to produce relatively high molecular weight, paraffinic hydrocarbons when using a cobalt catalyst. In a slurry process, a syngas comprising a mixture of $H_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions. The mole ratio of the hydrogen to the carbon monoxide may broadly range from about 0.5 to 4, but is more typically within the range of from about 0.7 to 2.75 and preferably from about 0.7 to 2.5. A particularly preferred Fischer-Tropsch process is taught in EP0609079, also completed incorporated herein by reference for all purposes.

Suitable Fischer-Tropsch catalysts comprise on or more Group VIII catalytic metals such as Fe, Ni, Co, Ru and Re.

Additionally, a suitable catalyst may contain a promoter. Thus, a preferred Fischer-Tropsch catalyst comprises effective amounts of cobalt and one or more of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 and about 50 weight percent of the total catalyst composition. The catalysts can also contain basic oxide promoters such as $ThO_2$, $La_2O_3$, MgO, and $TiO_2$, promoters such as $ZrO_2$, noble metals (Pt, Pd, Ru, Rh, Os, Ir), coinage metals (Cu, Ag, Au), and other transition metals such as Fe, Mn, Ni, and Re. Support materials including alumina, silica, magnesia and titania or mixtures thereof may be used. Preferred supports for cobalt containing catalysts comprise titania. Useful catalysts and their preparation are known and illustrative, but nonlimiting examples may be found, for example, in U.S. Pat. No. 4,568,663.

The products from Fischer-Tropsch reactions performed in slurry bed reactors generally include a light reaction product and a waxy reaction product. The light reaction product (a predominantly $C_{5-20}$ fraction, commonly termed the "condensate fraction") includes hydrocarbons boiling below about 700° F.(e.g., tail gases through middle distillates), with decreasing amounts up to about $C_{30}$. The waxy reaction product (a predominantly $C_{20}+$ fraction, commonly termed the "wax fraction") includes hydrocarbons boiling above about 600° F. (e.g., vacuum gas oil through heavy paraffins), with decreasing amounts down to $C_{10}$. Both the light reaction product and the waxy product are substantially paraffinic. The waxy product generally comprises greater than 70% normal paraffins, and often greater than 80% normal paraffins. The light reaction product comprises paraffinic products with a significant proportion of alcohols and olefins. In some cases, the light reaction product may comprise as much as 50%, and even higher, alcohols and olefins.

In the process, at least a portion of the product stream from the hydrocarbon synthesis is blended with at a portion of the natural gas condensate, the prepare a stream containing less than about 200 ppm sulfur. A preferred product stream from the hydrocarbon synthesis includes $C_{5-20}$ hydrocarbons.

Hydroprocessing

A blend of crude oil fractions and various fractions from the hydrocarbon synthesis step, and, optionally, natural gas condensate, is subjected to hydroprocessing conditions. The hydroprocessing conditions include, for example, hydrotreating, hydroisomerization and/or hydrocracking. During hydroprocessing, olefins and oxygenates may be hydrotreated to form paraffins, paraffins may be hydroisomerized to form isoparaffins and hydrocarbons with chain lengths above a desired value, for example, $C_{20}$, may be hydrocracked. A $C_{5-20}$ product stream, including a mixture of paraffins and isoparaffins, can be isolated.

Hydrotreating

As used herein, "hydrotreating" or "hydrotreatment" is given its conventional meaning and describes processes that are well known to those skilled in the art. Hydrotreating refers to a catalytic process, usually carried out in the presence of free hydrogen, for desulfurization and/or denitrification of the feedstock, for oxygenate removal and for olefin saturation, depending on the particular needs of the refiner and on the composition of the feedstock. The sulfur is generally converted to hydrogen sulfide, the nitrogen is generally converted to ammonia and the oxygen converted to water, and these can be removed from the product stream using means well known to those of skill in the art. Hydrotreating conditions include a reaction temperature between 400°–900° F. (204°–482° C.), preferably 650°–850° F. (343°–454° C.); a pressure between 500 to 5000 psig (pounds per square inch gauge) (3.5–34.6 MPa), preferably 1000 to 3000 psig (7.0–20.8 MPa); a feed rate (LHSV) of 0.5 $hr^{-1}$ to 20 $hr^{-1}$ (v/v); and overall hydrogen consumption 300 to 2000 scf per barrel of liquid hydrocarbon feed (53.4–356 $m^3H_2$ /$m^3$ feed). The hydrotreating catalyst for the beds will typically be a composite of a Group VI metal or compound thereof, and a Group VIII metal or compound thereof supported on a porous refractory base such as alumina. Examples of hydrotreating catalysts are alumina supported cobalt-molybdenum, nickel sulfide, nickel-tungsten, cobalt-tungsten and nickel-molybdenum. Typically such hydrotreating catalysts are presulfided. Preferred hydrotreating catalysts of the present invention comprise noble-metal such as platinum and/or palladium on an alumina support.

Hydroisomerization

As used herein, "hydroisomerization" refers to processes which isomerize normal paraffins to form isoparaffins. Typical hydroisomerization conditions are well known in the literature and can vary widely. Isomerization processes are typically carried out at a temperature between 200° F. and 700° F., preferably 300° F. to 650° F., with a LHSV between 0.1 and 10, preferably between 0.25 and 5. Hydrogen is employed such that the mole ratio of hydrogen to hydrocarbon is between 1:1 and 15:1. Catalysts useful for isomerization processes are generally bifunctional catalysts that include a dehydrogenation/hydrogenation component and an acidic component. The acidic component may include one or more of amorphous oxides such as alumina, silica or silica-alumina; a zeolitic material such as zeolite Y, ultrastable Y, SSZ-32, Beta zeolite, mordenite, ZSM-5 and the like, or a non-zeolitic molecular sieve such as SAPO-11, SAPO-31 and SAPO-41. The acidic component may further include a halogen component, such as fluorine. The hydrogenation component may be selected from the Group VIII noble metals such as platinum and/or palladium, from the Group VIII non-noble metals such as nickel and tungsten, and from the Group VI metals such as cobalt and molybdenum. If present, the platinum group metals will generally make up from about 0.1% to about 2% by weight of the catalyst. If present in the catalyst, the non-noble metal hydrogenation components generally make up from about 5% to about 40% by weight of the catalyst.

Hydrocracking

Hydrocracking catalysts with high selectivity for mid-distillate products are known. As used herein, "hydrocracking" refers to cracking hydrocarbon chains to form smaller hydrocarbons. This is generally accomplished by contacting hydrocarbon chains with hydrogen under increased temperature and/or pressure in the presence of a suitable hydrocracking catalyst. Hydrocracking catalysts with high selectivity for middle distillate products or naphtha products are known, and such catalysts are preferred. For hydrocracking, the reaction zone is maintained at hydrocracking conditions sufficient to effect a boiling range conversion of the VGO feed to the hydrocracking reaction zone, so that the liquid hydrocrackate recovered from the hydrocracking reaction zone has a normal boiling point range below the boiling point range of the feed. Typical hydrocracking conditions include: reaction temperature, 400° F.–950° F. (204° C.–510° C.), preferably 650° F.–850° F. (343° C.–454° C.); reaction pressure 500 to 5000 psig (3.5–34.5 MPa), preferably 1500–3500 psig (10.4–24.2 MPa); LHSV, 0.1 to 15 hr−1 (v/v), preferably 0.25–2.5 hr−1; and hydrogen consumption 500 to 2500 scf per barrel of liquid hydrocarbon feed (89.1–445 m3 H2/m3 feed). The hydrocracking catalyst generally comprises a cracking component, a hydrogenation component and a binder. Such catalysts are well known in the art. The cracking component may include an amorphous silica/alumina phase and/or a zeolite, such as a Y-type or USY zeolite. The binder is generally silica or alumina. The hydrogenation component will be a Group VI, Group VII, or Group VIII metal or oxides or sulfides thereof, preferably one or more of molybdenum, tungsten, cobalt, or nickel, or the sulfides or oxides thereof. If present in the catalyst, these hydrogenation components generally make up from about 5% to about 40% by weight of the catalyst. Alternatively, platinum group metals, especially platinum and/or palladium, may be present as the hydrogenation component, either alone or in combination with the base metal hydrogenation components molybdenum, tungsten, cobalt, or nickel. If present, the platinum group metals will generally make up from about 0.1% to about 2% by weight of the catalyst.

The catalyst particles may have any shape known to be useful for catalytic materials, including spheres, fluted cylinders, prills, granules and the like. For non-spherical shapes, the effective diameter can be taken as the diameter of a representative cross section of the catalyst particles. The effective diameter of the zeolite catalyst particles is in the range of from about 1/32 inch to about 1/4 inch, preferably from about 1/20 inch to about 1/8 inch. The catalyst particles will further have a surface area in the range of from about 50 to about 500 m$^2$/g.

More than one catalyst type may be used in the hydroprocessing step. The different catalyst types can be separated into layers or mixed. The hydroprocessing conditions can be varied depending on the fractions derived from the hydrocarbon synthesis step. For example, if the fractions include predominantly $C_{20}$+ hydrocarbons, the hydroprocessing conditions can be adjusted to hydrocrack the fraction and provide predominantly $C_{5-20}$ hydrocarbons. If the fractions include predominantly $C_{5-20}$ hydrocarbons, the hydroprocessing conditions can be adjusted to minimize hydrocracking. Those of skill in the art know how to modify reaction conditions to adjust amounts of hydrotreatment, hydroisomerization, and hydrocracking.

When the blended stream to be hydroprocessed includes less than about 200 ppm of sulfur, the hydroprocessing catalysts are preferably noble metal-containing catalysts. The catalysts preferably have high selectivity for $C_5$+ products, such that a significant $C_4$− fraction is not formed. A catalyst which is useful in the present process is described in U.S. application Ser. No. 08/883,006, the contents of which are hereby incorporated by reference in its entirety. A similar catalyst is described, for example, in U.S. Ser. No. 09/267,095, the contents of which are hereby incorporated by reference in its entirety. Suitable hydroprocessing catalysts and conditions are described, for example, in U.S. Pat. No. 6,093,672 to Winquist et al., the contents of which are hereby incorporated by reference in its entirety. Other hydroprocessing catalysts with high selectivity for mid-distillate products are described, for example, in U.S. Pat. Nos. 5,925,235; 5,536,687; and 6,030,921, the contents of which are hereby incorporated by reference in its entirety.

When the blended streams to be hydroprocessed include more than about 200 ppm of sulfur, the catalysts are conventional hydroprocessing catalysts useful for such streams. Suitable catalysts and conditions are described, for example, in U.S. Pat. No. 6,075,061, the contents of which are hereby incorporated by reference in its entirety. Other catalysts are described below.

The hydroprocessing conditions can be varied depending on the fractions derived from the hydrocarbon synthesis step. For example, if the fractions include predominantly $C_{20}$+ hydrocarbons, the hydroprocessing conditions can be adjusted to hydrocrack the fraction and provide predominantly $C_{5-20}$ hydrocarbons. If the fractions include predominantly $C_{5-20}$ hydrocarbons, the hydroprocessing conditions can be adjusted to minimize hydrocracking. Those of skill in the art know how to modify reaction conditions to adjust amounts of hydrotreatment, hydroisomerization, and hydrocracking.

Optional Process Steps

In one embodiment, the crude oil fractions, and, optionally, the natural gas condensate is hydroprocessed in one reactor with a sulfided catalyst and the products from the hydrocarbon processing step are hydroprocessed in a reactor with a non-sulfided noble metal catalyst with high selectivity for mid-distillate products, as described above. Alternatively, a layered hydrotreater can be used, where a top layer uses a catalyst in a non-sulfided environment to process the hydrocarbon synthesis products, and a bottom layer includes a sulfur-tolerant catalyst into which the crude oil fractions, and, optionally, the natural gas condensate is added. In these embodiments, the crude oil and/or natural gas condensate do not need to be treated to remove sulfur, and the resulting blended products will likely include sulfur unless they have been hydrotreated or otherwise treated to remove sulfur. Any remaining heteroatom-containing compounds can be removed, for example, as described below.

Heteroatom Removal

The crude oil fractions, natural gas condensate and, in those embodiments where sulfided catalysts are used, products derived from these materials may include sulfur-containing compounds. Since the syngas is essentially sulfur-free, no appreciable amount of sulfur is likely to come from the hydrocarbon synthesis products, although oxygenates are often formed. The amount of sulfur in the blended stream to be co-hydroprocessed may meet the 200 ppm specification without additional treatment, particularly since the hydrocarbon synthesis products include such low levels of sulfur. In that case, it may not be necessary or desirable to remove the sulfur compounds. However, the crude oil, natural gas condensate and/or the products of the co-hydroprocessing can be upgraded to remove heteroatom impurities and other undesirable materials.

Methods for removing heteroatom impurities are well known to those of skill in the art, and include, for example, extractive Merox, hydrotreating, adsorption, etc. Hydrotreating is the preferred means for removing these and other impurities.

While the invention has been described in terms of various preferred embodiments, the skilled artisan will appreciate that various modifications, substitutions, omissions and changes can be made without departing from the spirit thereof. Accordingly, it is intended that the scope of the present invention be limited solely by the scope of the following claims, including equivalents thereof.

What is claimed is:

1. A process for producing a hydrocarbon stream including $C_{5-20}$ normal and iso-paraffins, comprising:
   a) treating a methane-rich stream, which is isolated from a natural gas source, to remove sulfur-containing impurities contained therein;
   b) converting at least a portion of the methane-rich stream into syngas, and using the syngas in a hydrocarbon synthesis reaction;
   c) isolating a product stream from the hydrocarbon synthesis;
   d) blending at least a portion of the product stream from the hydrocarbon synthesis with a crude oil fraction, to prepare a blended stream containing less than about 200 ppm sulfur;
   e) hydroprocessing the blended stream using a noble metal-containing catalyst; and
   f) recovering at least one naphtha product.

2. The process of claim 1, wherein the hydrocarbon synthesis step is a Fischer-Tropsch synthesis.

3. The process of claim 1, wherein the hydroprocessing conditions involve hydrotreatment and/or hydroisomerization.

4. The process of claim 1, wherein the hydroprocessing conditions involve using an acidic catalyst.

5. The method of claim 1, further comprising treating the hydroprocessed product to lower the concentration of heteroatoms after the hydroprocessing step.

6. The method of claim 1, further comprising adding natural gas condensate to the blended stream.

7. The method of claim 6, further comprising co-hydroprocessing the natural gas condensate with the $C_{5-20}$ and/or $C_{20}+$ product stream.

8. A process for producing a hydrocarbon stream including $C_{5-20}$ normal and iso-paraffins, comprising:
   a) treating a methane-rich stream, which is isolated from a natural gas source, to remove sulfur-containing impurities contained therein;
   b) converting at least a portion of the methane-rich stream into syngas, and using the syngas in a hydrocarbon synthesis reaction;
   c) isolating a product stream from the hydrocarbon synthesis,
   d) blending at least a portion of the product stream from the hydrocarbon synthesis with a crude oil fraction, to prepare a blended stream containing more than about 200 ppm sulfur, and
   e) hydroprocessing the blended stream using a sulfur-tolerant catalyst.

9. The process of claim 8, wherein the hydrocarbon synthesis step is a Fischer-Tropsch synthesis.

10. The process of claim 8, wherein the hydroprocessing includes hydrocracking.

11. The process of claim 8, wherein the hydroprocessing includes hydrotreatment and/or hydroisomerization conditions.

12. The process of claim 8, wherein the hydroprocessing conditions involve using an acidic catalyst.

13. The process of claim 8, wherein the hydroprocessing catalyst comprises a pre-sulfided catalyst.

14. The process of claim 13, wherein the pre-sulfided catalysts comprises between about 0.1 and 10 wt % sulfur.

15. The process of claim 8, wherein the catalysts comprise a Group VIII non-noble metal, cobalt, molybdenum or tungsten.

16. The process of claim 8, wherein the sulfur compounds present in the crude oil fraction act as a hydrocracking suppressant in the hydroprocessing step.

17. The method of claim 8, further comprising treating the hydroprocessed product to lower the concentration of heteroatoms after the hydroprocessing step.

* * * * *